(No Model.)
J. R. TYSON.
NUT LOCK.
No. 413,269.  Patented Oct. 22, 1889.
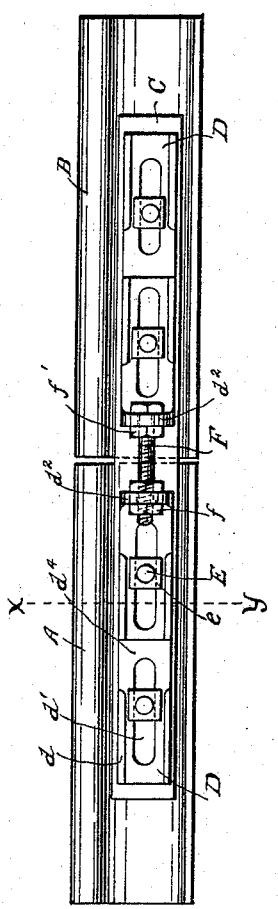
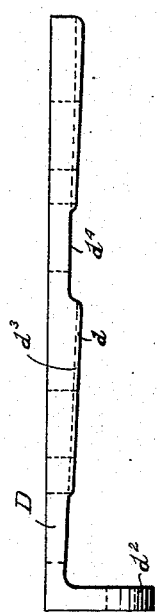
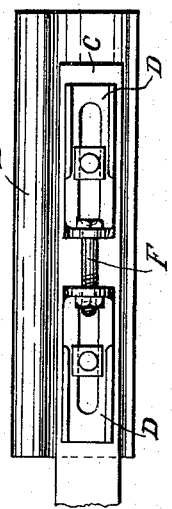
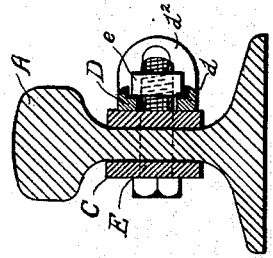
WITNESSES
Ed. A. Kelly
Ed. B. Ulrich
James R. Tyson
INVENTOR
Attorney

UNITED STATES PATENT OFFICE.

JAMES R. TYSON, OF READING, PENNSYLVANIA.

NUT-LOCK.

SPECIFICATION forming part of Letters Patent No. 413,269, dated October 22, 1889.

Application filed June 18, 1889. Serial No. 314,740. (No model.)

*To all whom it may concern:*

Be it known that I, JAMES R. TYSON, a citizen of the United States, residing at Reading, in the county of Berks and State of Pennsylvania, have invented certain new and useful Improvements in Rail-Joints; and I do declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to a form of nut-lock adapted more especially for rail-joints. Heretofore a single slotted plate has been arranged to engage the splice-bolts passed through the abutting ends of two rails, projecting flanges thereon being adapted to lock the bolt-nuts by the end movement of said plate.

The object of my invention is to provide a means of tightening the nuts and locking them by one operation, at the same time insuring the security of the joint under all the exigencies of service, yet readily permitting the breaking of the joint when desired.

The invention is fully described herein and specified in the claims.

Figure 1 is a full elevation of a railway-rail joint, showing the application of my invention. Fig. 2 is an enlarged edge view of my locking-plate. Fig. 3 is a sectional view through X Y of Fig. 1. Fig. 4 shows a modified arrangement of the plates.

A and B represent the abutting ends of two adjoining rails; C, an ordinary fish bar or plate; E and $e$, the splice or fastening bolts and nuts, respectively. The locking-plates D D are provided with slots $d'$, through which pass the ends of bolts E, and are provided with short projecting flanges $d$ on one or both edges, between which flanges are flat places $d^4$ on the plates, while the portion of each plate from which the flanges $d$ project is slightly wedge-shaped at $d^3$, as shown in Fig. 2. The adjoining ends of each plate are provided with ears $d^2$, through which passes a threaded bolt provided with a nut $f$.

In the operation of jointing the rails the plates D D are passed loosely over the ends of bolts E, and the nuts $e$ are run against the flat surfaces $d^4$ between the flanges $d$. By means of bolt F and nut $f$ the two plates are then drawn together, the inclined surfaces $d^3$ being wedged under the nuts $e$ as the latter pass between flanges $d$, thus simultaneously tightening and locking the nuts. As the tendency of the plates is to separate, owing to the opposite direction of their inclines, the tension upon bolt F will effectually prevent the nut $f$ from loosening. Additional nuts $f'$, however, may be placed upon the bolt F between the ears $d^2$, and may serve the double purpose of jam-nuts and of forcing the plates D apart when the joint is to be broken.

I do not limit my invention to the exact construction or application herein described, as it is evident that the former may be modified considerably without departing from the spirit of my invention, and also that it may be applied to the tightening and locking of nuts in a variety of cases. For instance, it may be adapted to any two or more adjacent bolts, as shown in Fig. 4.

What I claim is—

1. The combination, with the fastening bolts and nuts, of the slotted wedge-bolts with ears $d^2$, and a bolt F, connecting said plates, all adapted to operate substantially as set forth.

2. The combination, with the fastening bolts and nuts, of the slotted plates provided with the flat surfaces $d^4$, flanges $d$, and ears $d^2$, and a bolt F, connecting said plates, all substantially as set forth.

3. The combination, with the fastening bolts and nuts, of the slotted wedge-plates provided with flat surfaces $d^4$, flanges $d$, and ears $d^2$, and a bolt F, connecting said plates, all substantially as set forth.

4. The combination, with the rails, fish-bar, and fastening bolts and nuts, of the slotted wedge-plates provided with flat surfaces $d^4$, flanges $d$, and ears $d^2$, and a bolt F, with nuts $f$ and $f'$ connecting said plates, all substantially as set forth.

In testimony whereof I affix my signature in presence of two witnesses.

JAMES R. TYSON.

Witnesses:
 LEW. S. LEVAN,
 WM. M. GOODMAN.